_United States Patent_ [19]

von dem Hagen et al.

[11] Patent Number: 4,651,730

[45] Date of Patent: Mar. 24, 1987

[54] GAS METERING DEVICE FOR MEDICAL APPARATUS

[75] Inventors: Tronje von dem Hagen, Obernwohlde; Carl F. Wallroth, Lubeck, both of Fed. Rep. of Germany

[73] Assignee: Drägerwerk Ag, Fed. Rep. of Germany

[21] Appl. No.: 679,755

[22] Filed: Dec. 10, 1984

[30] Foreign Application Priority Data

Dec. 16, 1983 [DE] Fed. Rep. of Germany ..... 33455856

[51] Int. Cl.$^4$ ............................................. A61M 16/00
[52] U.S. Cl. ............................ 128/204.21; 128/204.18
[58] Field of Search ....................... 128/200.14, 203.12, 128/202.22, 204.21–204.26, 204.18, 204.28, 205.13, 205.17, 205.24, 716, 725, 207.18; 37/834, 841

[56] References Cited

U.S. PATENT DOCUMENTS

| 3,729,000 | 4/1973 | Bell | 128/204.21 |
| 4,241,732 | 12/1980 | Berndtsson | 128/204.21 X |
| 4,421,113 | 12/1983 | Gedeon et al. | 128/204.23 |
| 4,457,303 | 7/1984 | Durkan | 128/204.24 |
| 4,461,293 | 7/1984 | Chen | 128/204.23 |
| 4,462,398 | 7/1984 | Durkan et al. | 128/203.12 X |
| 4,506,666 | 3/1985 | Durkan | 128/204.24 X |

FOREIGN PATENT DOCUMENTS 3229328 8/1984 Fed. Rep. of Germany .

_Primary Examiner_—Kyle L. Howell
_Assistant Examiner_—Angela D. Sykes
_Attorney, Agent, or Firm_—McGlew and Tuttle

[57] ABSTRACT

In medical apparatus, an accurate and quickly responding metering is required for admixing anesthetic gases. The gas pressure must not be a disturbing factor. A gas metering device comprises a metering unit connected to the gas source and delivering the metered gas through an outlet. A control is effected through an electrically operated control unit having a desired value input section and a display section. The gas enters into an inlet buffer of the metering unit and passes therefrom into a pressure space and simultaneously, through a change-over valve 11 in normal position, into a measuring space. In its switched position, a change over valve establishes connection to the outlet. In the outlet line a switch valve is provided closing in its normal position and opening in its switched position. The pressure space and the measuring space are connected to each other through a differential pressure sensor. With the two valves in normal position, the measuring space is filled with gas up to a desired pressure, for bringing the valves into their switched positions in which the gas volume flows to the outlet. With the pressure drop thereby obtained, the valves reassume their normal positions.

5 Claims, 1 Drawing Figure

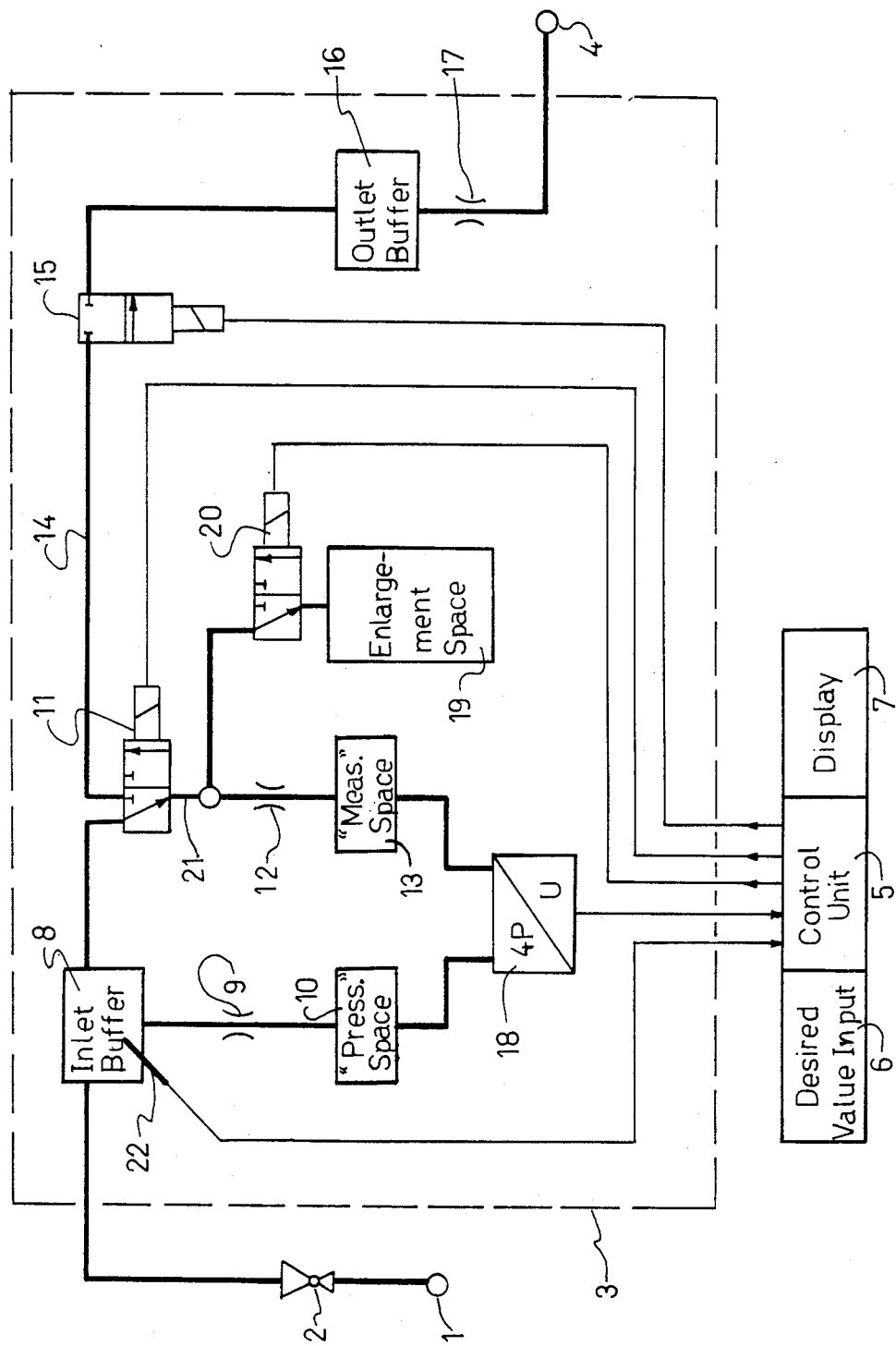

GAS METERING DEVICE FOR MEDICAL APPARATUS

FIELD AND BACKGROUND OF THE INVENTION

This invention relates in general to a gas metering device and to a device for supplying gas through a flow line to an outlet after it is measured in a measuring space and compared with gas accumulated in a pressure space.

A similar gas metering device is known from German patent application No. 32 29 328.3-35. The gas metering device can be employed anywhere, provided electrical control signals are available. Conventional change-over valves are used for switching.

The German application No. 32 29 328.3-35 discloses a gas metering device for medical apparatus, comprising a metering unit which is interconnected with the control unit, supplied through a pressure reducer with the gas to be metered, and delivers this gas in metered amounts through an outlet to a point of use. Within the metering unit, a buffer is connected to the pressure reducer at the supply side. At the other side, the buffer is connected through a throttle to a pressure space, and, through a change-over valve to a measuring space. The change-over valve is actuable by the control unit and upon switching, connects the meauring space through an outlet throttle to the outlet of the metering unit. A differential pressure sensor is connected through gas pipes to the pressure space and the measuring space, and delivers its electrical signals to the control unit.

During a metering cycle, the gas flows from the pressure source through the buffer and the change-over valve into the measuring space to fill it up. At the same time, a comparison pressure is maintained in the pressure space and safeguarded against instantaneous variations by a throttle. When the differential pressure sensor detects equal pressure in the pressure space and the measuring space, the control unit causes switching of the change-over valve. The gas then flows from the measuring space to the outlet, and the pressure in the measuring space drops. As soon as the pressure difference relative to the pressure space, and thus the signal from the differential pressure sensor, reaches a predetermined limit value, the control unit returns the change-over valve into its initial position, to start a new cycle.

The metered gas flow results from the volume of the metering space, the differential pressure in each cycle, and the switching frequency of the cycles. Unfortunately, the comparison pressure from the pressure space passes as filling pressure of the measuring space through the differential pressure sensor directly into the metered amount. The adjustment range is limited by the volume of the measuring space, for example. To enlarge the adjustment range, a plurality of independent metering units of different size may be provided in a metering device, and associated with a common control unit. The adjustment to a desired gas flow is then effected by selecting the suitable metering unit.

SUMMARY OF THE INVENTION

The invention is directed to a metering device of the above mentioned kind which can be controlled by electrical signals while being independent of an initial pressure, and is usable over a wide metering range.

The features covered by the independent claims further enlarge the applicability of the inventive gas metering device.

The principal advantage of the invention is that due to the provision of the switch valve in the outlet line, the switching pressure, thus the differential pressure causing the cyclic switching, becomes independent of the initial pressure $p_o$. The differential pressures $\Delta p_1$ and $\Delta p_2$ for each switching of the change-over valve and the switch valve practically eliminate the initial pressure $p_o$ within the cycles. That is, with the practically equal $p_o$, the differential pressure result from $$\Delta p_1 = p_o - p_1$$

$$\Delta P_2 = p_o - p_2$$

Accordingly, it is an object of the invention to provide a gas metering device in which gas is accumulated in a measuring space and a pressure space and the differential pressure therebetween is measured for the purpose of controlling the flow through a gas flow line from a gas supply to an outlet.

A further object of the invention is to provide a gas metering device particularly for respirators which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

In the drawings:

The only FIGURE of the drawing is a schematic diagram of a metering device constructed in accordance with the invention.

DESCRIPTION OF THE PREFERRED EMBODIMENTS

Referring to the drawing in particular the invention embodied therein comprises a gas metering device which includes a gas supply 1 having an output line 14 with one end connected to a supply 1 and an opposite end defining an outlet 4. The output line 14 carries an inlet buffer 8 and a change-over valve 11 downstream therefrom which regulates flow in a gas bypass line 21 having a separate measuring space 13 and a pressure space 10 with a differential pressure sensor 18 located therebetween for sensing the differential pressure between the pressure space 10 and the measuring space 13. Control of the gas flow is effected by an electrically operating control unit 5 which has a desired value input section 6 and a display section 7. Gas which enters into the inlet buffer 8 of the metering unit 3 and passes therefrom into the pressure space 10 and simultaneously through the change-over valve 11 which is in a normal open position into the measuring space 13. In a switch position, the change-over valve 11 establishes a connection to the outlet 4. In the output line 14 a switch valve 15 is provided which closes in its normal position and opens in its switched position. Pressure space 10 and measuring space 13 are connected to each other through the differential pressure sensor 18.

In accordance with the invention, with the two valves in a normal position, the measuring space 13 is filled with gas up to a desired pressure for bringing the valves into their switched positions in which the gas volume flows to the outlet 4. After the switching a pressure drop is obtained and the valves reassume their normal positions.

A metering unit 3 is supplied with gas from a gas source 1 through a pressure reducer 2, and then delivers the gas in metered amounts through an outlet 4 to a point of use.

A control unit 5 controls metering unit 3 on the basis of signals which are obtained from the metering unit 3 and from a desired value input 6. The adjusted values and any disturbances are shown in a display 7.

Through corresponding pipes, an inlet buffer 8 of metering unit 3 is connected to the pressure reducer 2, and, through a throttle 9, to a pressure space 10, and further, through a change-over valve 11 in normal position, and a measuring throttle 12, to a measuring space 13.

In the output line 14 toward outlet 4, switch valve 15 closed in normal position and an outlet buffer 16, and an outlet throttle 17 are provided sequentially in the downstream direction.

A differential pressure sensor 18 is connected through gas lines to pressure space 10 and to measuring space 13 and, through an electrical signal line, to the control unit 5. By means of an enlargement space 19, which can be connected or disconnected by means of an enlargement valve 20 which is mounted in a gas bypass line 21 provided between change-over valve 11 and measuring throttle 12, the metering range can be widened.

A temperature sensor 22 in inlet buffer 8 is provided to monitor the temperature of the supplied gas and, through control unit 5, to correct the temperature and thus adjust the metering more accurately.

Electrical signals of control unit 5 control change-over valve 11, switch valve 15, and enlargement valve 20.

In operation, the gas to be metered flows from gas source 1 through the pressure reducer 2, the inlet buffer 8, the change-over valve 11 in a normal position, and the measuring throttle 12 into measuring space 13 to fill the space up to an operating pressure $p_2$. Switch valve 15 is in its normal, i.e. closed position and an initial pressure $p_o$ is present in pressure space 10. At a differential pressure $\Delta P_2 = p_o - p_2$ which is preset through desired value input 6, change-over valve 11 is switched and switch valve 15 opens with a certain predetermined delay. The gas flows through outlet buffer 16, outlet throttle 17, and outlet 4 to the point of use. The pressure in measuring space 13 drops and the differential pressure in sensor 18 rises until the desired differential pressure $\Delta p_1 = p_o - p_1$ is reached. Switch valve 15 closes again, while change-over valve 11 returns, again with a certain delay, into its normal position open to inlet buffer 8. The described switching cycle starts again.

Enlargement space 19 may be connected through desired value input 6, to augment the volume of measuring space. In this way, other gas volumina may be adjusted, resulting in a total gas stream of $V = (p_2 - p_1) \times$ measuring volume $\times$ number of cycles.

While a specific embodiment of the invention has been shown and described in detail to illustrate the application of the principles of the invention, it will be understood that the invention may be embodied otherwise without departing from such principles.

What is claimed is:

1. A gas metering device, comprising a gas supply, an output line having one end connected to said gas supply and an opposite outlet end, said line supplying gas from said gas supply to said outlet end, an inlet buffer connected into said output line, a changeover valve connected into said output line downstream of said inlet buffer, a bypass line having a separate measuring space and a pressure space and a differential pressure sensor between said pressure space and said measuring space connected between said changeover valve and said inlet buffer, said differential pressure sensor sensing the differential pressure between said separate measuring space and said pressure space, a switch valve in said output line which is normally closed and which opens in a switched position, and a control unit having a desired value input and being connected to said differential pressure sensor, to said changeover valve, and to said switch valve for supplying gas from said gas supply to said measuring space through said changeover valve until said measuring space fills up to a desired pressure corresponding to said desired value and then to cause the switching of said switch valve to permit gas to flow to said outlet end through said switch valve.

2. A gas metering device according to claim 5, including a measuring throttle located in said bypass line between said change-over valve and said measuring space.

3. A gas metering device according to claim 5, including a side passage connected into said bypass line having an enlargement space, and an enlargement space valve in said side passage and connected to said control unit for being controlled thereby.

4. A gas metering device according to claim 5, including a temperature sensor connected to said control unit located in said inlet buffer.

5. A gas metering device according to claim 1, including an outlet buffer in said outlet end downstream of said switch valve and an outlet throttle in said outlet end downstream of said outlet buffer.

* * * * *